United States Patent [19]

Takamatsu et al.

[11] 4,446,281

[45] May 1, 1984

[54] MODIFIED CIS-1,4-POLYISOPRENE RUBBER, A PROCESS FOR MANUFACTURING THE SAME, AND A COMPOSITION CONTAINING THE SAME

[75] Inventors: Hideo Takamatsu; Shobu Minatono, both of Ibaraki, Japan

[73] Assignee: Kuraray Co., Ltd., Kurashiki, Japan

[21] Appl. No.: 379,713

[22] Filed: May 19, 1982

[30] Foreign Application Priority Data

May 26, 1981 [JP] Japan ................................. 56-80641

[51] Int. Cl.$^3$ ............................................. C08C 19/28
[52] U.S. Cl. .................................. 525/282; 525/285;
525/382; 525/301; 525/304
[58] Field of Search ................ 525/282, 285, 382, 301,
525/304

[56] References Cited

U.S. PATENT DOCUMENTS

| | | |
|---|---|---|
| 3,778,418 | 11/1973 | Nakayama ........................... 525/285 |
| 3,965,076 | 6/1976 | Yamauchi et al. .................. 525/285 |
| 4,137,282 | 1/1979 | Otsuki et al. ........................ 525/285 |

FOREIGN PATENT DOCUMENTS

| | | |
|---|---|---|
| 2838930 | 10/1979 | Fed. Rep. of Germany . |
| 2944082 | 5/1980 | Fed. Rep. of Germany . |
| 2300108 | 9/1976 | France . |

*Primary Examiner*—Wilbert J. Briggs, Sr.
*Attorney, Agent, or Firm*—Oblon, Fisher, Spivak, McClelland & Maier

[57] ABSTRACT

Modified cis-1,4-polyisoprene rubber obtained by incorporating into cis-1,4-polyisoprene rubber a side chain formed by succinimide residue containing in the N position a hydrocarbon residue having at least one tertiary nitrogen atom. This rubber is excellent in green strength at ordinary room temperature, and flowability at an elevated temperature. Its vulcanizate is comparable to, or better than natural rubber in breaking strength and hardness.

10 Claims, 5 Drawing Figures

MODIFIED CIS-1,4-POLYISOPRENE RUBBER, A PROCESS FOR MANUFACTURING THE SAME, AND A COMPOSITION CONTAINING THE SAME

BACKGROUND OF THE INVENTION

This invention relates to modified cis-1,4-polyisoprene rubber. More particularly, it is concerned with cis-1,4-polyisoprene rubber modified by incorporation of a side chain composed of a succinimide residue having in the N position a hydrocarbon group having a tertiary amino group.

Synthetic cis-1,4-polyisoprene rubber (hereinafter referred to as IR) has a molecular structure which is similar to that of natural rubber (hereinafter referred to as NR). It is closer to NR in properties than any other synthetic rubber. It has a high degree of workability, and the vulcanized product thereof has excellent physical properties. It is one of general-purpose synthetic rubbers which are used as a substitute for NR in the manufacture of automobile tires, industrial rubber products, rubber footwear, and the like. As IR is a synthetic product, it contains an extremely smaller quantity of impurities and foreign matter than NR. This feature enables reduction in the possibility of occurrence of trouble, such as the production of rejective products, which might be caused by impurities and foreign matter. This is one of the outstanding features of IR which has created a great demand for IR in certain fields of applications.

IR is, however, considerably inferior to NR in green strength. Accordingly, it is likely to cause a cold flow during storage, and various kinds of trouble are likely to occur during the manufacture of rubber products as will hereinafter be pointed out. When unvulcanized materials are put together and molded to form a tire, they are likely to undergo sagging or change in physical property, or the tire cords embedded in the unvulcanized materials are likely to get displaced, resulting in failure to provide uniform tires. The low green strength of IR, however, means its good flowability. It is, therefore, one reason to blend IR into NR despite some reduction in its green strength. Common radial-ply tires, which became using in large amount recently, needs high hardness and modulus, but high and uniform hardness generally was introduced by high hardness of the vulcanized material and flowability of the unvulcanized material. However, the poor flowability of NR, if it is used alone, is often likely to result in various kinds of trouble, including failure to provide a smooth surface or clearly engraved pattern, during calendering, extrusion molding, press vulcanization, or like operation which is performed at a temperature of, say, 80° C. to 150° C.

It has, therefore, been thought desirable to develop rubber having as high a green strength as that of NR in the vicinity of ordinary room temperature, and as high a degree of flowability as that of IR at a relatively high temperature, and which shows excellent physical properties when vulcanized.

Various attempts have hitherto been made to improve the green strength of IR. A typical attempt resides in the addition of maleic anhydride to IR. This method is considered as one of the most effective methods, since modified IR can be produced inexpensively by a relatively simple reaction. The modified IR obtained by this method is, however, inferior to IR in flowability at a high temperature, and the physical properties of its vulcanizate are not satisfactory, though it is comparable to NR in green strength.

Japanese Laid-Open Patent Specification No. 102148/73 proposes the incorporation into synthetic rubber, such as IR, of maleamic acid of the general formula

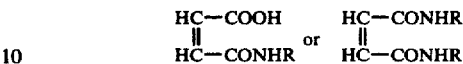

where R stands for a hydrogen atom, or an alkyl, phenyl, chlorophenyl, nitrophenyl, benzyl, formylaminophenyl or cyclohexyl group, or a derivative of maleamide, or maleinhydrazide in order to improve its green strength without lowering the physical properties of its vulcanizate. EXAMPLE 1 shown therein indicates certain improvements in the green strength of synthetic rubber at ordinary room temperature, and the strength and modulus of its vulcanizate, but simultaneously suggests the necessity for improvement in flowability and workability at an elevated temperature, since the breaking strength of the unvulcanizate measured at 80° C. was as high as, or even higher than that of NR which is at least 1.6 times higher than that of IR.

Japanese Laid-Open Patent Specification No. 45198/76 proposes that an amine, such as an alcohol amine or polyethyleneimine having at least three amino groups, be incorporated into modified IR containing maleic anhydride. Although the incorporation of an alcohol amine improves the green strength of the modified IR, it is not so high as that of NR, and the breaking strength and hardness of its vulcanizate are not so high as those of NR. The use of polyethyleneimine does not improve the flowability of the modified IR at an elevated temperature; in other words, its breaking strength at an elevated temperature is not so low as that of IR.

As is obvious from the foregoing description, there has hitherto not been available any modified IR that is satisfactory in all of such aspects as green strength, flowability and workability at an elevated temperature, and the breaking strength and hardness of its vulcanizate. Moreover, the vulcanizates of modified IR obtained by any known method have generally been low in tear strength, even if their breaking strength and hardness are improved.

SUMMARY OF THE INVENTION

This invention improves the drawbacks of IR and modified IR which have hereinabove been pointed out. The principal objects of this invention is to provide novel modified cis-1,4-polyisoprene rubber which is excellent in green strength and flowability at an elevated temperature, and of which the vulcanizate is comparable to, or better than NR in breaking strength and hardness.

It is another object of this invention to provide modified cis-1,4-polyisoprene rubber of which the vulcanizate is not only high in breaking strength and hardness, but is also satisfactorily high in tear strength.

It is still another object of this invention to provide a process for manufacturing such modified cis-1,4-polyisoprene rubber.

It is a further object of this invention to provide a rubber composition containing such modified cis-1,4-polyisoprene rubber.

According to this invention, the aforesaid objects are attained by modified cis-1,4-polyisoprene rubber which comprises synthetic cis-1,4-polyisoprene rubber containing as a side chain at least 0.01 mole, per 100 recurring units of isoprene monomer in the rubber, of a functional group of the general formula (I)

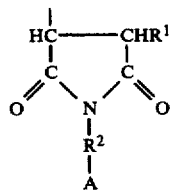

where $R^1$ stands for hydrogen, or a covalent bond with a rubber molecule, $R^2$ stands for a hydrocarbon residue having not more than 20 carbon atoms, and optionally containing oxygen or sulfur in its principal chain, and A stands for an N,N-dihydrocarbylamino residue having not more than 20 carbon atoms, or a heterocyclic residue containing at least one tertiary nitrogen atom as a hetero nitrogen atom.

The modified rubber of this invention can surprisingly be vulcanized at a rate which is equal to, or higher than the vulcanization rate of NR.

The modified rubber of this invention can be manufactured by:

(1) adding to synthetic cis-1,4-polyisoprene rubber at least 0.01 mole of a compound selected from the group consisting of maleic anhydride, maleic acid, maleic acid monoester and maleic acid diester per 100 recurring units of isoprene monomer in the rubber, adding then an amine of the general formula (II) $H_2N—R^2—A$, where $R^2$ and A are as defined in connection with the general formula (I), and performing dehydration or dealcoholization to form an imide ring; or (2) adding to synthetic cis-1,4-polyisoprene rubber at least 0.01 mole of a maleimide derivative of the general formula (III)

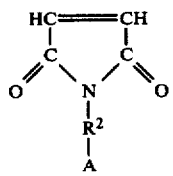

where $R^2$ and A are as defined in connection with the general formula (I), per 100 recurring units of isoprene monomer in the rubber.

BRIEF DESCRIPTION OF THE DRAWINGS

The invention will now be described in further detail with reference to the accompanying drawings, in which.

DETAILED DESCRIPTION OF THE INVENTION

Figure 1:
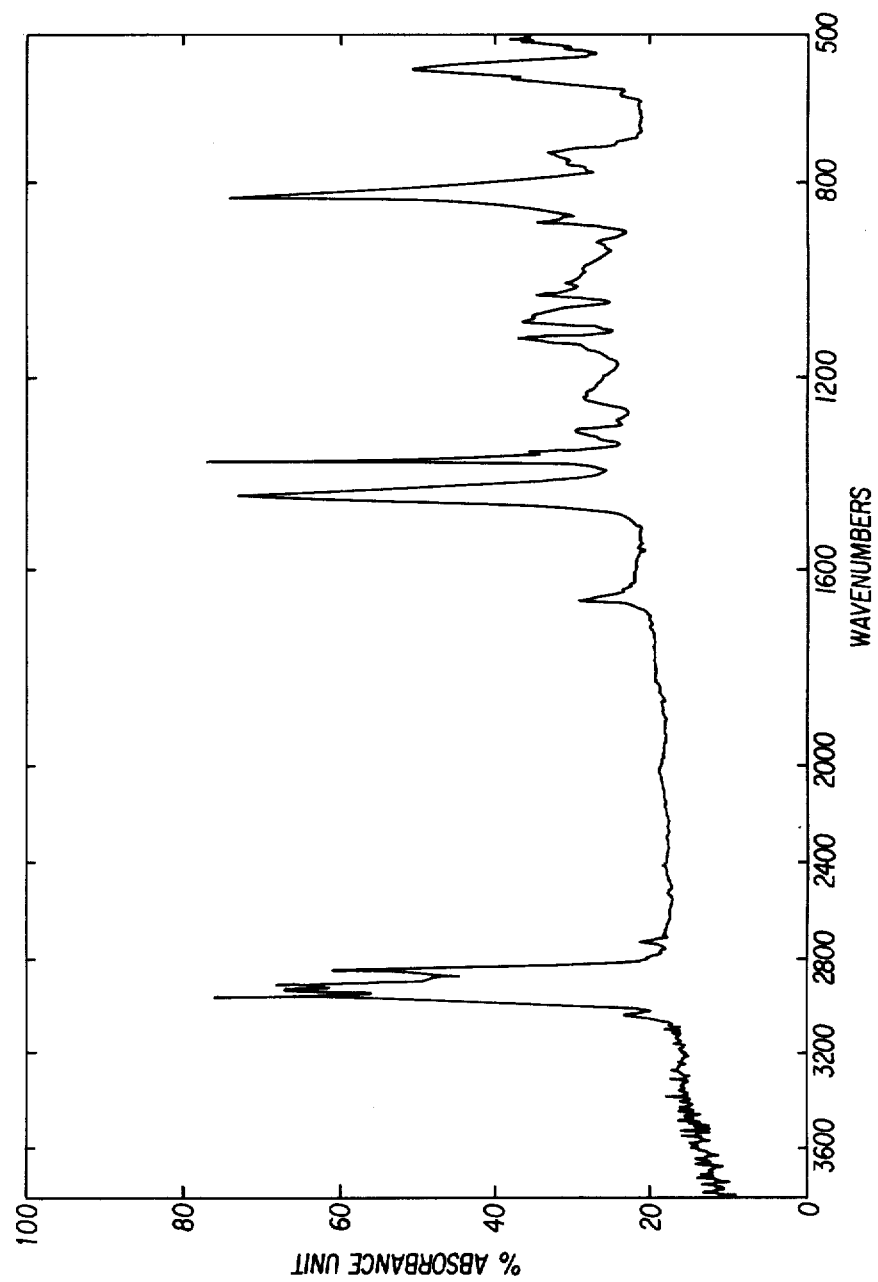
FIGS. 1, 2 and 3 are graphs showing the infrared absorption spectra of IR, modified IR obtained by adding maleic anhydride, and modified IR obtained by adding thereto (dimethylamino)propylamine and containing N-(γ-dimethylamino)propyl succinimide, respectively, which will all appear in EXAMPLE 1.

For the purpose of this invention, it is possible to use a solid synthetic cis-1,4-polyisoprene rubber(IR) obtained by polymerizing isoprene monomer with a Ziegler or anionic catalyst, and having a cis-1,4 content of at least 80%. From the standpoint of physical properties, however, it is preferable to use high cis-1,4-polyisoprene rubber obtained with a Ziegler catalyst, and having a cis-1,4 content of at least 95%. It is possible to use rubber having any molecular weight if it is a solid, but it is preferable to use rubber having a molecular weight of 200,000 to 2,000,000.

The amine used for the preparation of the modified cis-1,4-polyisoprene rubber of this invention by method hereinabove described at (I) is express by the general formula (II) $H_2N—R^2—A$, in which $R^2$ stands for:

(a) an alkylene residue having not more than 20 carbon atoms, and optionally forming a branch;

(b) a cycloalkylene residue having not more than 20 carbon atoms, and optionally forming a branch;

(c) a hetero-atom containing hydrocarbon residue of the general formula $-(-R^3—Z_n-)-R^4-$, in which $R^3$ and $R^4$ stand for the same or different groups selected from among ethylene, lower alkyl-substituted ethylene and propylene groups, Z stands for oxygen or sulfur, and n is an integer which is not smaller than 1, and having not more than 20 carbon atoms;

(d) an aromatic hydrocarbon residue selected from between arylenealkaarylene and aralkarylene groups; or (e) an aromatic hydrocarbon residue containing a hetero atom (oxygen or sulfur), and having not more than 20 carbon atoms, such as an allyloxyallylene group.

In the general formula (II), A may, for example, stand for:

(i) a dialkylamino residue having not more than 20 carbon atoms;

(ii) a diarylamino residue having not more than 20 carbon atoms;

(iii) a diaralkylamino residue having not more than 20 carbon atoms;

(iv) any other dihydrocarbyl residue of the general formula

in which $R^5$ and $R^6$ stand for the same or different hydrocarbon residue having not more than 20 carbon atoms; or (v) a 5- or 6-member heterocyclic residue containing at least one tertiary nitrogen atom alone as a hetero nitrogen atom.

In view of economical consideration, it is preferable to use as $R^2$ and A a residue having not more than 20 carbon atoms, and more preferably 2 to 12 carbon atoms.

Typical examples of the amines which may be used for this invention include (dialkylamino)alkylamine, (N,N-dialkylaminoalkoxy)alkylamine, amine obtained by substitution of poly(alkanediyloxy) for alkanediyloxy in the amine mentioned immediately above, p-N,N-dialkylaminomethylbenzylamine, p-N,N-dialkylaminophenylamine, N-aminoalkylpiperidine, N-aminoalkyl-picoline, N-aminoalkyl-morpholine, 1-aminoalkyl-4-alkyl-piperazine, aminoalkyl pyridine, and picolylamine. It is also possible to use (dialkylamino)alkylamine having a (dialkylamino)alkyl residue substituted for hydrogen in an alkylene residue between nitrogen atoms. It is particularly preferable to use (dialkylamino)alkylamine, such as (dimethylamino)ethylamine, (diethylamino)ethylamine, (dipropylamino)ethylamine, (dimethylamino)propylamine, (diethylamino)propylamine, (dimethylamino)butylamine, (diethylamino)butylamine, (dimethylamino)hexylamine or (dimethylamino)decylamine, or (N,N-dialkylamino)alkoxyalkylamine, such as (N,N-dimethylamino)ethoxyethylamine, (N,N-dimethylamino)ethoxypropylamine, or α-(3-aminopropyl)-ω-(3-dimethylaminopropyl)oxy-poly(oxy-1,2-ethanediyl)

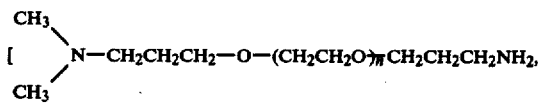

in which n is an integer of 1 to 7]. If polyethyleneimine, amino-alcohol or N,N'-diphenyl-p-phenylenediamine is used instead of the amines as hereinabove listed, the objects of this invention cannot be attained, as will hereinafter be set forth by way of comparative examples.

The maleimide derivative used as a modifying agent for the manufacture of the modified IR of this invention by the method hereinbefore described at (2) is expressed by the general formula (III)

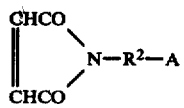

in which $R^2$ and A are as hereinbefore defined, and contains a hydrocarbon residue having a teritary nitrogen atom in the N position. It is particularly preferable to use N-(dialkylamino)alkylmaleimide, such as N-(β-dimethylamino)ethylmaleimide, N-(β-diethylamino)ethylmaleimide, N-(γ-dimethylamino)propylmaleimide, N-(γ-diethylamino)propylmaleimide, N-(δ-dimethylamino)butylmaleimide, or N-(δ-diethylamino)butylmaleimide.

Maleic anhydride, maleic acid, maleic acid monoester or diester, or a maleic acid derivative, such as a maleimide of the general formula (III), may be added into IR in the form of a solution, or in a solid state. In the former case, IR is dissolved in a solvent, such as an aliphatic, alicyclic or aromatic hydrocarbon, a maleic acid derivative, for example, is added into the solution, and the solution is heated in the presence or absence of a radical forming agent, such as a peroxide or azo compound. Although there is no particular limitation to the reaction conditions, it is usually heated at a temperature of 25° C. to 250° C., preferably 50° C. to 200° C., for a period of 0.1 minute to 100 hours, preferably 0.5 to 30 hours. In the latter case, a maleic acid derivative, for example, is mixed with IR by using a roll mill, kneader, Banbury mixer, screw extruder, or the like. The reaction may be performed in the presence of a catalyst, such as a peroxide or azo compound, though it often does not require any such catalyst. Although there is no particular limitation to the reaction conditions, the reaction is usually performed at a temperature of 25° C. to 300° C., preferably 50° C. to 250° C., for a period of 0.1 minute to 100 hours, preferably 0.5 minute to 30 hours.

If the quantity of the maleic acid derivative in IR is too small, hardly any effect of modification can be expected, and if it is too large, there is obtained an unvulcanizate having too high a strength to ensure satisfactory workability at an elevated temperature. Therefore, the quantity of the maleic acid derivative is preferably in the range of 0.01 to 10 moles, particularly 0.01 to 2 moles, and more preferably 0.05 to 1.0 mole, per 100 recurring units of isoprene monomer in IR.

The modified IR obtained by adding maleic anhydride, maleic acid, or maleic ester is reacted with an amine of the general formula (II) at a temperature of 0° to 150° C. for a period of 0.1 minute to 20 hours. This reaction forms an acid anhydride or carboxyl group into an amide, and it is converted to an imide by dehydration or dealcoholization. If the reaction is not complete, some monosuccinamidecarboxylic acid is likely to remain in the product. If its quantity is small, there is no problem, but if it is large, there is every likelihood that the properties claimed to be obtained by this invention may not be obtained. It is, therefore, preferable to heat or otherwise treat the product so that the monosucinamidecarboxylic acid group may form an imide.

The modified IR of this invention is excellent in green strength, workability at an elevated temperature, rate of vulcanization, and the physical properties of its vulcanizate. Therefore, it is useful not only for those applications for which IR has hitherto been used, but for other applications as well.

For such applications, it is possible to use compounding agents employed ordinarily for the manufacture of rubber products. Examples of the compounding agents include a reinforcing agent (5–200 phr), such as carbon black (soft or hard), or calcium carbonate, a filler (5–200 phr), a vulcanizating agent (0.1–10 phr), such as sulfur or peroxide, an auxiliary vulcanization accelerator (0.01–7 phr), an antioxidant (0.05–5 phr) a softening agent (1–40 phr), such as oil, and a resin (1–200 phr), such as rosin, a terpene, petroleum phenol, epoxy, polyester or polyamide resin. Examples of the rubber constituent include natural rubber, untreated IR, styrene-butadiene rubber, polybutadiene rubber and other synthetic rubbers, and in some cases, a mixture thereof with liquid polyisoprene or polybutadiene. In the event the modified IR of this invention is mixed with unmodified IR, it is important to ensure that the modified IR and the unmodified IR have a weight ratio of 5:95 to 95:5, and that the mixture contain 0.01 to 2.0 mole % of the compound of the general formula I or II.

The modified IR of this invention may advantageously be employed to manufacture various parts of an automobile tire, such as a tread, carcass, bead, bead filler or rim strip, industrial products such as V-belts, hoses, vibration insulators or rubber rolls, rubbercoated fabrics, rubber shoes, rubber threads, rubber rings, sponge rubber, and the like.

The invention will now be described more specifically with reference to several examples which are not intended to limit the scope of this invention. In these examples, rubber was tested in accordance with the procedures of JIS K-6301, and parts and % are shown by weight.

EXAMPLE 1

Figure 2:
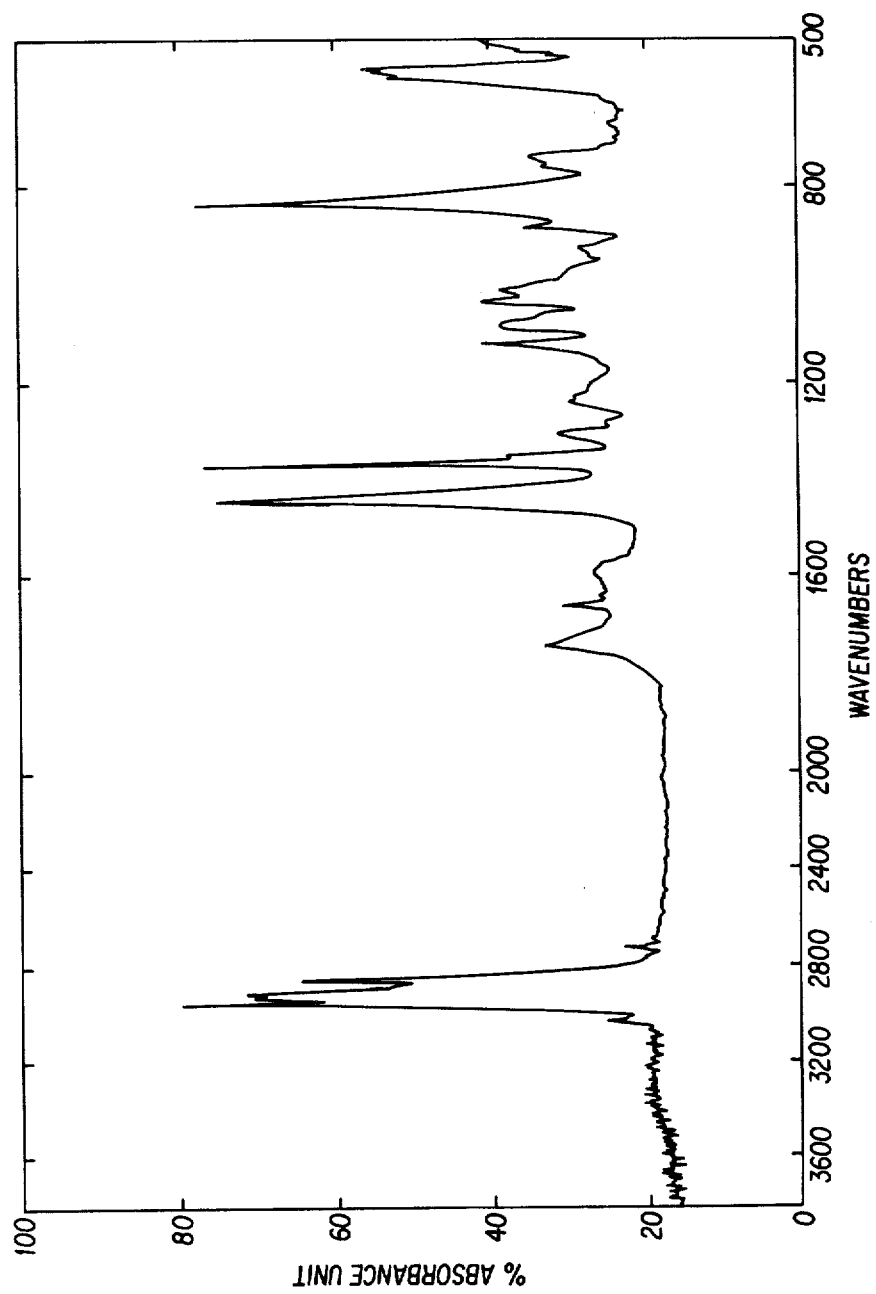

Synthetic cis-1,4-polyisoprene rubber prepared with a Ziegler catalyst, and having a cis-1,4 content of 98% and a molecular weight of 840,000 (Kuraprene IR-10; product of KURARAY ISOPRENE CHEMICAL CO., LTD., Japan) was dissolved in toluene to form a 10% IR solution. Maleic anhydride was added into the solution so that it might contain 2.5 parts of maleic anhydride per 100 parts of IR. The solution was heated at 180° C. for five hours to yield a solution of IR modified with maleic anhydride. The modified IR was recovered from the solution, and purified. The reaction ratio of maleic anhydride was 12%. The total reflection spectrum of the modified IR was obtained at an incidence angle of 70° and by 20 times of integration by employing an infrared spectrophotometer (Digilab's FTS-20% Fourier transformation type). The spectrum obtained is shown in FIG. 2, while FIG. 1 shows an infrared spectrum of unmodified IR. As is obvious from FIGS. 1 and 2, the peak which were due to the carbonyls of the acid anhydride groups were found at 1,790 cm$^{-1}$ and 1,870 cm$^{-1}$, and testified the formation of the IR modified with maleic anhydride. The quantity of the succinic anhydride residue in the IR modified with maleic anhydride, which was determined by absorption at 1,790 cm$^{-1}$ and 1,870 cm$^{-1}$, was 0.21 mole per 100 recurring units of isoprene monomer in the IR.

Figure 3:
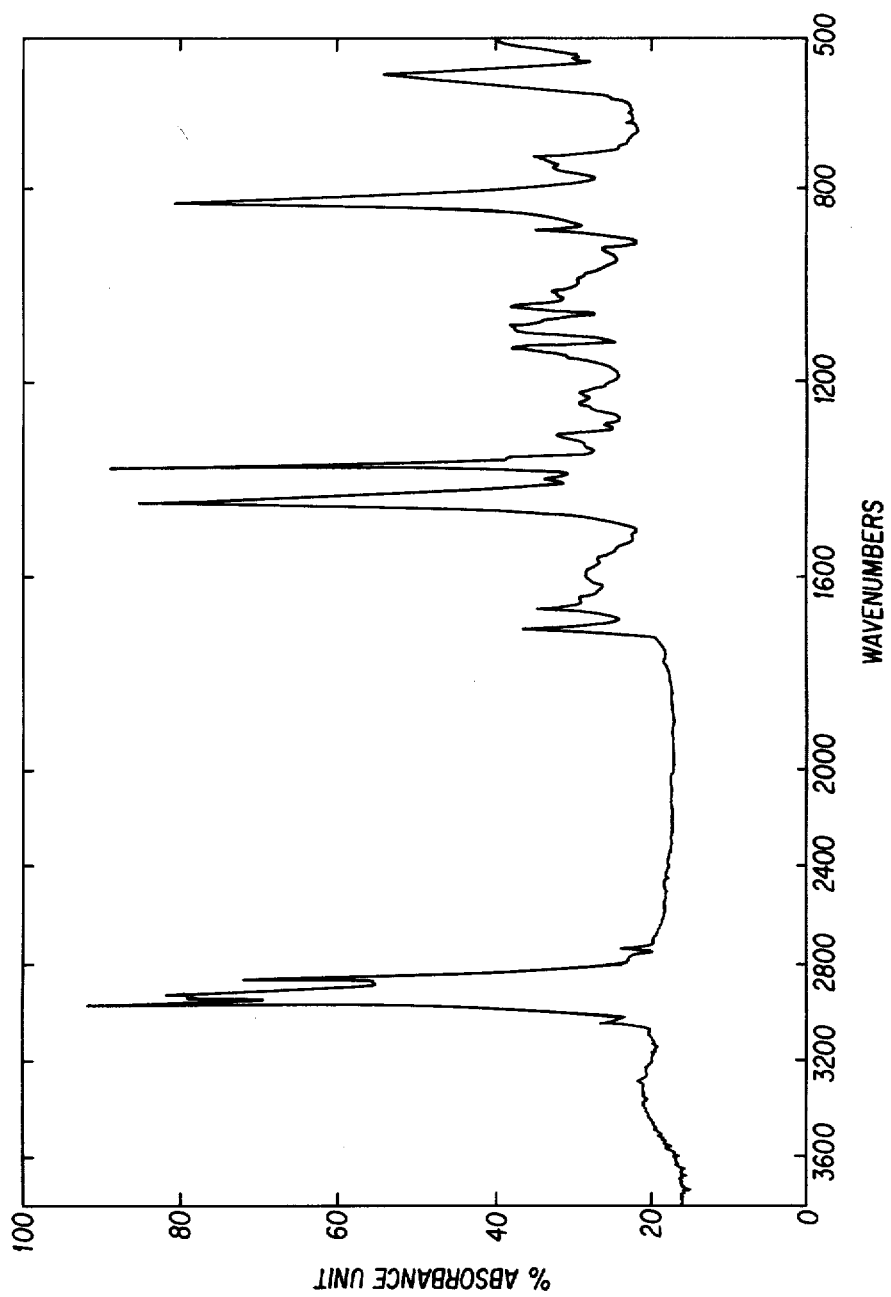

A 10% toluene solution of the modified IR obtained as hereinabove described was heated to 100° C. Five parts of (dimethylamino)propylamine, per 100 parts of the modified IR, were added into the solution. After the solution had been stirred for 30 minutes, its temperature was raised again, and it was heated at 180° C. for three hours. After the reaction product had been cooled, it was poured into methanol, recovered, and vacuum dried. FIG. 3 shows an infrared absorption spectrum of the product. It did not show any absorption that had been observed in the vicinity of 1,790 cm$^{-1}$ or 1,870 cm$^{-1}$ due to the carbonyls of the acid anhydride group (succinic anhydride residues) in the case of the IR modified with maleic anhydride, but instead of it, showed the absorptions due to the carbonyls of succinimide residue in the vicinity of 1,700 cm$^{-1}$ and 1,770 cm$^{-1}$. These facts ascertained the replacement of the succinic anhydride residue in the modified IR by an N-(γ-dimethylamino)propyl succinimide residue, and hence, the formation of modified IR containing 0.21 mole of N-(γ-dimethylamino)propylsuccinimide residue per 100 recurring units of isoprene monomer in the IR.

For comparison purpose, several other kinds of modified IR were likewise prepared by adding, instead of (dimethylamino)propylamine, an equal molar quantity of ethanolamine, di-n-propylamine, ethylenediamine, polyethyleneimine having a molecular weight of 1,200 (PEI SP-012, product of NIPPON SHOKUBAI KAGAKU KOGYO K.K., Japan) or N,N'-diphenyl-p-phenylenediamine (Antigen P, product of SUMITOMO CHEMICAL INDUSTRIAL CO., LTD., Japan) to the IR modified with maleic anhydride.

Rubber compositions were prepared from the modified IR, unmodified IR and NR in accordance with the recipe shown in TABLE 1. Strips having a thickness of 2 mm and a width of 6 mm were prepared from the unvulcanized rubber compositions, and tested for tensile strength, yield point, 300% modulus ($M_{300}$), breaking strength and elongation at break by an Instron tester at a pull rate of 500 mm/min. at 25° C. and 100° C. The rubber compositions were press cured at 145° C. for 30 minutes to form vulcanizates. The vulcanizates were similarly tested for $M_{300}$, breaking strength, and elongation at break at 25° C. They were also tested for hardness and tear strength. The test results are shown in TABLE 2.

TABLE 1

| Rubber | 100 parts |
|---|---|
| HAF carbon black | 45 parts |
| Zinc white | 5 parts |
| Stearic acid | 3 parts |
| Sulfur | 2 parts |
| Vulcanization accelerator[1] | 1 part |
| Antioxidant[2] | 1 part |

[1]N—oxydiethylene-2-benzothiazolylsulfenamide, NOCCELR MAS, product of OUCHI SHINKO KAGAKU KOGYO K.K., Japan;
[2]Poly(2,2,4-trimethyl-1,2-dihydroquinoline), NOCRAC 224, product of OUCHI SHINKO KAGAKU KOGYO K.K., Japan.

TABLE 2

| | Example of this invention | Comparative Example | | | | | Control Example[1] | Control Example[2] |
| | | 1 | 2 | 3 | 4 | 5 | 1 (IR) | 2 (NR) |
|---|---|---|---|---|---|---|---|---|
| Amine used for modification of IR modified with maleic anhydride | Dimethylaminopropylamine | Ethanolamine | Di-n-propylamine | Ethylenediamine | Polyethyleneimine | N,N'—diphenyl-p-phenylenediamine | — | — |
| Mooney viscosity ($ML_{1+4}$ 100° C.) Physical properties of unvulcanizate at 25° C. | 59 | 60 | 61 | 62 | 63 | 61 | 57 | 55 |
| Yield point (kg/cm$^2$) | 1.9 | 1.6 | 2.0 | 2.0 | 2.3 | 1.7 | 1.1 | 1.9 |
| $M_{300}$ (kg/cm$^2$) | 3.4 | 2.7 | 3.6 | 3.5 | 3.9 | 3.2 | 0.7 | 4.0 |
| Breaking strength (kg/cm$^2$) | 11.9 | 6.5 | 12.3 | 10.8 | 8.5 | 9.8 | 0.6 | 12.8 |
| Elongation at break (%) Physical properties of un- | 570 | 690 | 590 | 550 | 510 | 530 | 680 | 550 |

TABLE 2-continued

| | Example of this invention | Comparative Example 1 | 2 | 3 | 4 | 5 | Control Example[1] 1 (IR) | Control Example[2] 2 (NR) |
|---|---|---|---|---|---|---|---|---|
| vulcanizate at 100° C. | | | | | | | | |
| Yield point ($10^{-1}$ kg/cm$^2$) | 2.0 | 3.0 | 5.0 | 6.0 | 8.0 | 6.0 | 2.0 | 3.0 |
| $M_{300}$ ($10^{-1}$ kg/cm$^2$) | 2.0 | 2.0 | 4.0 | 5.0 | 6.0 | 5.0 | | 2.0 |
| Breaking strength ($10^{-1}$ kg/cm$^2$) | 1.0 | 2.0 | 3.0 | 5.0 | 7.0 | 7.0 | 1.0 | 2.0 |
| Elongation at break (%) | 320 | 310 | 340 | 490 | 520 | 590 | 210 | 300 |
| Physical properties of vulcanizate at 25° C. | | | | | | | | |
| $M_{300}$ (kg/cm$^2$) | 162 | 139 | 144 | 143 | 144 | 147 | 138 | 151 |
| Breaking strength (kg/cm$^2$) | 300 | 297 | 298 | 287 | 292 | 298 | 299 | 301 |
| Elongation at break (%) | 560 | 540 | 540 | 550 | 540 | 560 | 550 | 530 |
| Hardness (JIS-A) | 66 | 61 | 62 | 62 | 63 | 63 | 61 | 65 |
| Tear strength (kg/cm$^2$) | 75 | 71 | 70 | 65 | 60 | 62 | 76 | 88 |

Notes:
[1] In Control Example 1, IR (Kuraprene IR-10) was used as the rubber constituent.
[2] In Control Example 2, NR (SMR-5L) was used as the rubber constituent.

As is obvious from TABLE 2, the breaking strength at 25° C. of the unvulcanizate of the modified IR obtained by adding with maleic anhydride to IR, and reacting their mixture with (dimethylamino)propylamine and containing N-(γ-dimethylamino) propylsuccinimide residue was improve to a level comparable to that of NR, its breaking strength at elevated temperature (100° C.) was nearly as low as that of IR, ensuring good flowability, which means good workability at an elevated temperature (100° C.) as will hereinafter be described in EXAMPLE 3, and its vulcanizate was improved 300% modulus, hardness and comparable to NR in breaking strength and elongation at break. On the other hand, the product obtained by employing ethanolamine as the modifying agent did not show any remarkable improvement in breaking strength at 25° C. and its vulcanizate was low in 300% modulus and hardness. The products obtained by employing di-n-propylamine, ethylenediamine, polyethyleneimine and N,N'-diphenyl-p-phenylenediamine were all extremely higher than NR in breaking strength at 100° C., which means their poor flowability at an elevated temperature (100° C.), and their vulcanizates were inferior in 300% modulus and hardness.

EXAMPLE 2

Modified IR containing N-(γ-dimethylamino)propylsuccinimide residue was prepared in accordance with the procedures of EXAMPLE 1, except that 12 parts of maleic acid and 20 parts of (dimethylamino)propylamine were used. The modified IR contained 1.41 moles of the succinimide residue per 100 recurring units of isoprene monomer in the IR.

For comparison purposes, modified IR containing monomethyl succinate residue was prepared in accordance with the procedures of EXAMPLE 1, except that monomethyl maleate was used instead of maleic anhydride. It contained 0.51 moles of monomethyl succinate residue per 100 recurring units of isoprene monomer in the IR.

Figure 4:
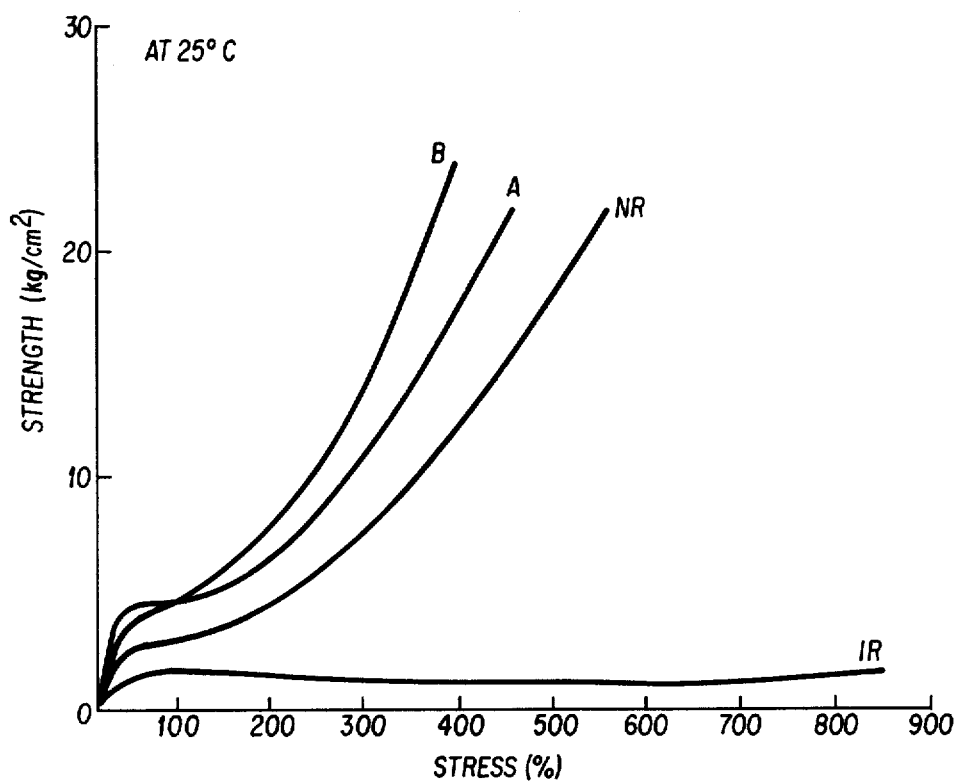
FIGS. 4 and 5 are curves showing the stress-strain characteristics, at 25° C. and 100° C., respectively, of unvulcanized rubber compositions containing as the rubber constituent the modified IR obtained by adding (dimethylamino)propylamine to IR modified with maleic anhydride and containing N-(γ-dimethylamino)propyl succinimide residue, which will appear in EXAMPLE 2. They also show the stress-strain characteristices of NR, IR and modified IR obtained by adding only monomethyl maleate. Curves A, B, NR and IR show the stress-strain characteristics of the modified IR containing N-(γ-dimethylamino)propyl succinimide residue, modified IR obtained by adding monomethyl maleate, natural rubber, and IR(unmodified), respectively.
Figure 5:
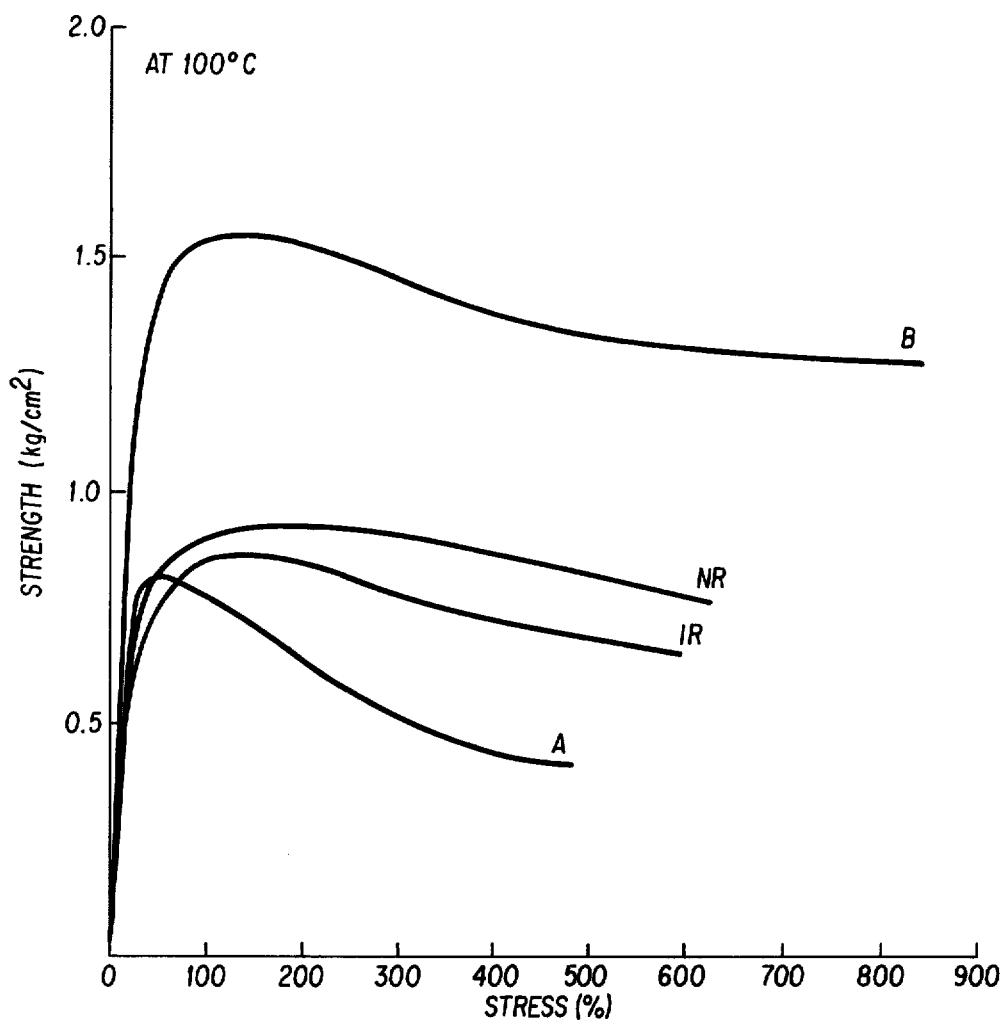

An unvulcanized rubber composition having a Mooney viscosity of about 80 was prepared from each of those two types of modified IR, unmodified IR and NR in accordance with the recipe adopted in EXAMPLE 1. The stress-strain characteristics of the unvulcanized rubber compositions at 25° C. and 100° C. were examined in accordance with the procedures employed in EXAMPLE 1. FIG. 4 shows their stress-strain characteristics at 25° C., while FIG. 5 shows the same at 100° C. In FIGS. 4 and 5, the abscissa indicates strain, and the ordinate stress. Curves A, B, NR and IR show the stress-strain characteristics of the unvulcanized rubber compositions prepared from the modified IR containing N-(γ-dimethylamino)propylsuccinimide residue (Mooney viscosity: 78), the modified IR containing monomethylsuccinate (Mooney viscosity: 79), natural rubber (Mooney viscosity: 81), and synthetic cis-1,4-polyisoprene rubber (Mooney viscosity: 80), respectively.

As is obvious from FIGS. 4 and 5, only the modified IR containing N-(γ-dimethylamino)propylmalsuccinimide residue showed a high green strength at a low temperature (25° C.), and its yield stress and breaking strength at an elevated temperature (100° C.) were lower than those of any other unvulcanized rubber composition. This latter fact is particularly important, and means its high workability at an elevated temperature. The modified IR containing monomethyl maleate showed a by far higher yield stress than that of NR, which is inferior in workability at an elevated temperature, though its green strength at 25° C. was improved. This modified IR is, thus, very poor in flowability at an elevated temperature.

EXAMPLE 3

IR having a molecular weight of 570,000 was prepared by masticating the IR (IR-10) employed in EXAMPLE 1, and 100 parts of the IR thus obtained were dissolved in toluene. Three parts of maleic anhydride were added into the IR solution, and the solution was subjected to reaction at 180° C. for 10 hours. An infrared absorption spectrum of the modified IR indicated the presence therein of 0.3 moles of succinic anhydride residue per 100 recurring units of isoprene monomer in the IR. A modifying agent, (I) ω-(N,N-dimethylamino)-decylamine, (II) dimethylaminoethoxyethylamine or (III) bis(γ,γ-dioctylamino)ethylpropylamine, was added to the modified IR in a quantity in excess of that of consumed maleic anhydride, and they were reacted at 160° C. under reduced pressure for three hours. The infrared absorption spectra of the reaction products showed the absorptions due to the carbonyls of the succinimide residue at 1,700 cm$^{-1}$ and 1,770 cm$^{-1}$, instead of the absorptions due to the carbonyls of the acid anhydride group at 1,790 cm$^{-1}$ and 1,870 cm$^{-1}$. It was, thus, found the modified IR containing N-(dimethylamino)decylsuccinimide residue had been form when the modifying agent (I) was used, modified IR containing N-(dimethylaminoethyoxy)ethylsuccinimide resedue when the modifying agent (II) was used, and modified IR containing N-(bis(γ,γ-dioctylamino)ethyl)propylsuccinimide when the modifying agent (III) was used.

These three types of modified IR, unmodified IR and NR were employed to form rubber compositions in accordance with the procedures of EXAMPLE 1, except that the recipe shown in TABLE 3 was used. The physical properties of the unvulcanizates at 25° C. and 100° C., and those of the vulcanizates at 25° C. were examined. The compositions were tested for extrusion by a Brabender test extruder. In TABLE 4, the word "good" indicates the results of extrusion which were comparable to those on unmodified IR, and the word "bad" indicates the results comparable to those on NR. The test results are shown in TABLE 4.

TABLE 3

| Rubber | 100 parts |
| --- | --- |
| HAF carbon black | 45 parts |
| Zinc white | 3 parts |
| Stearic acid | 1 part |
| Sulfur | 2 parts |
| Vulcanization accelerator | 1 part |
| Antioxidant | 1 part |

TABLE 4

|  | Example | Example | Example | Control (IR) | Control (NR) |
| --- | --- | --- | --- | --- | --- |
| Modifying agent added for further modification of IR modified with maleic anhydride | I | II | III | — | — |
| Mooney viscosity of composition (ML$_{1+4}$ 100° C.) | 79 | 80 | 78 | 81 | 80 |
| Physical properties of unvulcanizate at 25° C. |  |  |  |  |  |
| Yield point (kg/cm$^2$) | 2.7 | 3.0 | 2.5 | 1.4 | 2.8 |
| M$_{300}$ (kg/cm$^2$) | 6.1 | 6.9 | 5.3 | 1.4 | 6.0 |
| Breaking strength (kg/cm$^2$) | 15.6 | 17.3 | 13.2 | 2.0 | 15.9 |
| Elongation at break (%) | 590 | 530 | 620 | 720 | 530 |
| Physical properties of unvulcanizate at 100° C. |  |  |  |  |  |
| Yield point (× 10$^{-1}$ kg/cm$^2$) | 6 | 7 | 6 | 7 | 9 |
| M$_{300}$ (× 10$^{-1}$ kg/cm$^2$) | 6 | 6 | 4 | 6 | 9 |
| Breaking strength (× 10$^{-1}$ kg/cm$^2$) | 4 | 5 | 3 | 5 | 8 |
| Elongation at break (%) | 450 | 380 | 510 | 500 | 600 |
| Physical properties of vulcanizate at 25° C. |  |  |  |  |  |
| M$_{300}$ (kg/cm$^2$) | 143 | 147 | 153 | 132 | 148 |

TABLE 4-continued

|  | Example | Example | Example | Control (IR) | Control (NR) |
| --- | --- | --- | --- | --- | --- |
| Breaking strength (kg/cm$^2$) | 297 | 298 | 300 | 296 | 303 |
| Elongation at break (%) | 560 | 560 | 540 | 570 | 550 |
| Hardness (JIS-A) | 62 | 64 | 65 | 60 | 64 |
| Extrusion test | Good | Good | Good | Good | Bad |

Modifying agent:

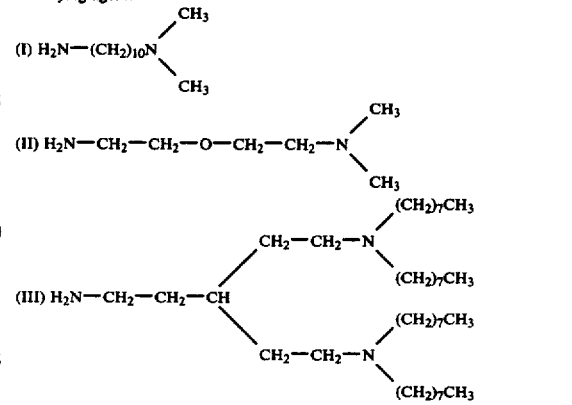

As is obvious from TABLE 4, the addition of the modifying agent (I), (II) or (III) to the modified IR containing succinic anhydride residue improved its breaking strength at 25° C. and the strength, 300% modulus and hardness of its vulcanizate at 25° C. to a level comparable to those of NR, and its strength of unvulcanizate at 100° C. and its extrusion properties were comparable to those of IR. (The products of EXAMPLE 1 were also examined for extrusion properties at 100° C. and breaking strength at 100° C. It was found that the product which was comparable to IR in breaking strength at 100° C. showed excellent extrusion properties comparable to those of IR, while the product comparable to NR in breaking strength at 100° C. showed only the extrusion properties comparable to those of NR. In other words, the general dependence of extrusion properties at 100° C. on breaking strength at 100° C. was ascertained.)

EXAMPLE 4

Different quantities of N-(γ-diethylamino)propylmaleimide were added to, and reacted with synthetic cis-1,4-polyisoprene rubber prepared with a Ziegler catalyst, and having a cis-1,4 content of 98% and a molecular weight of 840,000 (Kuraprene IR-10, product of KURARAY ISOPRENE CHEMICAL CO., LTD., Japan). They were first mixed at 100° C. for two minutes, and then kneaded at 220° C. for five minutes, by a Brabender Plasti-Corder. Each modified IR thus obtained was examined by an infrared spectrophotometer, and its infrared spectrum showed clear absorptions at 1,700 cm$^{-1}$ and 1,770 cm$^{-1}$ due to the carbonyls of succinimide residue, as shown in FIG. 3. The quantity (moles per 100 recurring units of isoprene in IR) of N-(γ-diethylamino)propylsuccinimide in the modified IR was determined by its infrared absorption spectrum, and is shown in TABLE 5.

For comparison purposes, modified IR was prepared by employing maleic anhydride or maleimide instead of N-(γ-diethylamino)propylmaleimide. The quantity of such incorporated maleic anhydride or maleimide in the modified IR is also shown in TABLE 5.

TABLE 5

| Modified IR | Kind of modifying agent and quantity of incorporated modifying agent (mole/100 isoprene units) | | |
|---|---|---|---|
| | N—(γ-diethylamino)-propylmaleimide | Maleic anhydride | Maleimide |
| A | 0.05 | — | — |
| B | 0.12 | — | — |
| C | 0.25 | — | — |
| D | 0.75 | — | — |
| E | — | 0.15 | — |
| F | — | — | 0.12 |

Rubber compositions were prepared from the various types of modified IR, unmodified IR and NR shown in TABLE 5 by kneading in accordance with the recipes shown in TABLE 6. The unvulcanized rubber compositions were press cured at 145° C. for 30 minutes to form vulcanizates. The unvulcanized rubber compositions were tested for yield point, 300% modulus ($M_{300}$), breaking strength and elongation at break at 25° C. and 100° C. in accordance with the procedures of EXAMPLE 1. The vulcanizates were likewise tested for 300% modulus ($M_{300}$), breaking strength and elongation at break at 25° C. They were also tested for hardness and tear strength. The results are shown in TABLE 6.

As is obvious from TABLE 6, four kinds of modified IR, (A) to (D) obtained by incorporating N-(γ-diethylamino)propylmaleimide were comparable to, or even better than NR in strength and elongation at a low temperature (25° C.), whether they were unvulcanized or vulcanized. Their green strength at ordinary room temperature was drastically higher than that of unmodified IR. Their breaking strength at an elevated temperature (100° C.) was sufficiently low to maintain good flowability under a relatively small load. This means their high workability. The hardness, 300% modulus and tear strength of their vulcanizated were higher than those of the products obtained by employing maleic anhydride and maleimide. The conventional products employing maleic anhydride and maleimide were high in breaking strength at an elevated temperature (100° C.), and low in flowability, though they had improved breaking strength at ordinary room temperature (25° C.).

TABLE 6

| Formulation No. | 1 | 2 | 3 | 4 | 5 | 6 | 7 | 8 |
|---|---|---|---|---|---|---|---|---|
| Recipe (parts) | | | | | | | | |
| NR | — | — | — | — | — | — | — | 100 |
| IR | — | — | — | — | — | — | 100 | — |
| Modified IR (A) | 100 | — | — | — | — | — | — | — |
| Modified IR (B) | — | 100 | — | — | — | — | — | — |
| Modified IR (C) | — | — | 100 | — | — | — | — | — |
| Modified IR (D) | — | — | — | 100 | — | — | — | — |
| Modified IR (E) | — | — | — | — | 100 | — | — | — |
| Modified IR (F) | — | — | — | — | — | 100 | — | — |
| Carbon black | 45 | 45 | 45 | 45 | 45 | 45 | 45 | 45 |
| Zinc white | 5 | 5 | 5 | 5 | 5 | 5 | 5 | 5 |
| Stearic acid | 3 | 3 | 3 | 3 | 3 | 3 | 3 | 3 |
| Sulfur | 2 | 2 | 2 | 2 | 2 | 2 | 2 | 2 |
| Vulcanization accelerator MAS | 1 | 1 | 1 | 1 | 1 | 1 | 1 | 1 |
| Antioxidant 224 | 1 | 1 | 1 | 1 | 1 | 1 | 1 | 1 |
| Mooney viscosity of composition ($ML_{1+4}$ 100° C.) | 55 | 53 | 51 | 57 | 58 | 56 | 57 | 55 |
| Physical properties of unvulcanizate at 25° C. | | | | | | | | |
| Yield point (kg/cm$^2$) | 1.5 | 1.5 | 1.7 | 1.7 | 1.5 | 1.4 | 1.1 | 1.9 |
| $M_{300}$ (kg/cm$^2$) | 1.5 | 2.5 | 3.5 | 5.0 | 2.1 | 2.4 | 0.7 | 4.0 |
| Breaking strength (kg/cm$^2$) | 3.1 | 6.0 | 9.9 | 15.0 | 5.0 | 5.9 | 0.6 | 12.8 |
| Elongation at break (%) | 610 | 580 | 570 | 550 | 670 | 570 | 680 | 550 |
| Physical properties of unvulcanizate at 100° C. | | | | | | | | |
| Yield point ($10^{-1}$ kg/cm$^2$) | 2 | 2 | 2 | 1 | 6 | 4 | 2 | 3 |
| $M_{300}$ ($10^{-1}$ kg/cm$^2$) | | 1 | 1 | 0.5 | 5 | 3 | | 2 |
| Breaking strength ($10^{-1}$ kg/cm$^2$) | 1 | 1 | 0.5 | 0.5 | 4 | 2 | 1 | 2 |
| Elongation at break (%) | 200 | 330 | 310 | 350 | 490 | 350 | 210 | 300 |
| Physical properties of vulcanizate at 25° C. | | | | | | | | |
| $M_{300}$ (kg/cm$^2$) | 149 | 155 | 165 | 170 | 141 | 143 | 138 | 151 |
| Breaking strength (kg/cm$^2$) | 300 | 301 | 297 | 298 | 300 | 298 | 299 | 301 |
| Elongation at break (%) | 550 | 560 | 540 | 530 | 550 | 550 | 550 | 530 |
| Hardness (JIS-A) | 64 | 66 | 67 | 69 | 62 | 62 | 61 | 65 |
| Tear strength (kg/cm$^2$) | 77 | 75 | 74 | 74 | 63 | 64 | 76 | 88 |

EXAMPLE 5

Synthetic cis-1,4-polyisorene rubber (Kuraprene IR-10 of KURARAY ISOPRENE CHEMICAL CO., LTD., Japan) was dissolved in toluene to form a 10% solution of IR. N-(γ-dimethylamino)propylmaleimide was added to, and reacted with the solution at 100° C. for five hours in the presence of a catalyst (0.01% of benzoyl peroxide based on IR), whereby modified IR containing N-(γ-dimethylamino)propylsuccinimide residue in the quantity (mole per 100 isoprene units in IR) shown in TABLE 7 was obtained. The rate of gelation in the modified IR was examined, and is shown in TABLE 7. The quantity of the gel was determined by a method comprising weighing about 1 g of rubber precisely, dissolving it in about 150 cc. of toluene at ordinary room temperature while shaking it for 12 hours, removing insoluble matter by filtration through 200-mesh metal wire sieve, and weighing the soluble and the insoluble after vacuum drying.

For comparison purposes, four kinds of modified IR were prepared by employing maleic anhydride instead of N-(γ-dimethylamino)propylmaleimide. The quantity of incorporated maleic anhydride (i.e. succinic anhydride residue) and the rate of gelation in these modified IR are shown in TABLE 7.

TABLE 7

| Modified IR | G | H | I | J |
|---|---|---|---|---|
| Quantity of N—(γ-dimethylamino)propylsuccinimide residue (mole/100 isoprene monomer units in IR) | 0.14 | 0.24 | — | — |
| Quantity of succinic anhydride residue (mole/100 isoprene monomer units in IR) | — | — | 0.14 | 0.27 |
| Rate of gelation (%) | 3 | 7 | 65 | 78 |

Rubber compositions were prepared from these kinds of modified IR in accordance with the recipes shown in TABLE 6, and vulcanized in accordance with the procedures described in EXAMPLE 1. The physical properties of the unvulcanized compositions and the vulcanizates thereof were examined in accordance with the procedures of EXAMPLE 1, and are shown in TABLE 8.

As shown in TABLE 8, these kinds of the modified IR obtained by employing N-(γ-dimethylamino)propylmaleimide Formulation Nos. 9 and 10) were superior to these kinds of the modified IR prepared by using maleic anhydride (Formulation Nos. 11 and 12) in the flowability of the unvulcanizate at an elevated temperature (100° C.) and the hardness, 300% modulus and tear strength of the vulcanizate.

What is claimed is:

1. A modified cis-1,4-polyisoprene rubber, comprising: a solid synthetic cis-1,4-polyisoprene rubber having a side chain functional group of the formula (I) incorporated into said synthetic rubber, said modified rubber containing at least 0.01 mole of said functional group per 100 recurring units of isoprene monomer in said synthetic rubber:

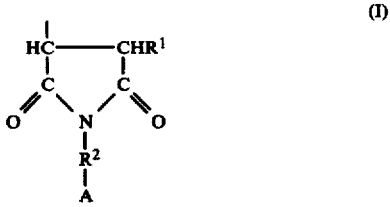

(I)

wherein $R^1$ represents hydrogen, or a covalent bond with a rubber molecule, $R^2$ represents a hydrocarbon residue having not more than 20 carbon atoms, optionally containing an oxygen or sulfur atom in its principal chain, and A represents a dihydrocarbylamino residue having not more than 20 carbon atoms, or a heterocyclic residue having not more than 20 carbon atoms and containing at least one tertiary nitrogen atom alone as a hetero nitrogen atom.

2. The modified cis-1,4-polyisoprene rubber of claim 1, wherein $R^2$ is an alkylene residue.

3. The modified cis-1,4-polyisoprene rubber of claim 1, wherein $R^2$ in said formula (I) is an alkoxyalkylene residue.

TABLE 8

| Formulation No. | 9 | 10 | 11 | 12 | 13 | 14 |
|---|---|---|---|---|---|---|
| Recipe (parts) | | | | | | |
| NR | — | — | — | — | — | 100 |
| IR | — | — | — | — | 100 | — |
| Modified IR (G) | 100 | — | — | — | — | — |
| Modified IR (H) | — | 100 | — | — | — | — |
| Modified IR (I) | — | — | 100 | — | — | — |
| Modified IR (J) | — | — | — | 100 | — | — |
| Carbon black | 45 | 45 | 45 | 45 | 45 | 45 |
| Zinc white | 5 | 5 | 5 | 5 | 5 | 5 |
| Stearic acid | 3 | 3 | 3 | 3 | 3 | 3 |
| Sulfur | 2 | 2 | 2 | 2 | 2 | 2 |
| Vulcanization accelerator MAS | 1 | 1 | 1 | 1 | 1 | 1 |
| Antioxidant 224 | 1 | 1 | 1 | 1 | 1 | 1 |
| Mooney viscosity of composition ($ML_{1+4}$ 100° C.) | 62 | 64 | 69 | 72 | 57 | 55 |
| Physical properties of unvulcanizate at 25° C. | | | | | | |
| Yield point (kg/cm$^2$) | 1.7 | 1.9 | 1.7 | 1.8 | 1.1 | 1.9 |
| $M_{300}$ (kg/cm$^2$) | 2.9 | 4.0 | 2.6 | 4.0 | 0.7 | 4.0 |
| Breaking strength (kg/cm$^2$) | 9.8 | 12.5 | 9.1 | 11.9 | 0.6 | 12.8 |
| Elongation at break (%) | 540 | 530 | 510 | 490 | 680 | 550 |
| Physical properties of unvulcanizate at 100° C. | | | | | | |
| Yield point ($\times 10^{-1}$ kg/cm$^2$) | 2 | 3 | 7 | 9 | 2 | 3 |
| $M_{300}$ ($\times 10^{-1}$ kg/cm$^2$) | 1 | | 6 | 7 | | 2 |
| Breaking strength ($\times 10^{-1}$ kg/cm$^2$) | 1 | 1 | 6 | 9 | 1 | 2 |
| Elongation at break (%) | 320 | 290 | 510 | 650 | 210 | 300 |
| Physical properties of vulcanizate at 25° C. | | | | | | |
| $M_{300}$ (kg/cm$^2$) | 160 | 167 | 142 | 145 | 138 | 151 |
| Breaking strength (kg/cm$^2$) | 299 | 298 | 301 | 300 | 299 | 301 |
| Elongation at break (%) | 550 | 540 | 560 | 550 | 550 | 530 |
| Hardness (JIS-A) | 68 | 68 | 61 | 62 | 61 | 65 |
| Tear strength (kg/cm$^2$) | 77 | 76 | 62 | 60 | 76 | 88 |

4. The modified cis-1,4-polyisoprene rubber of claim 1, wherein A in said formula (I) is a dialkylamino residue.

5. A process for manufacturing modified cis-1,4-polyisoprene rubber, which comprises:
adding a compound selected from the group consisting of maleic anhydride, maleic acid, maleic acid monoesters and maleic acid diesters to solid synthetic cis-1,4-polyisoprene rubber having a molecular weight ranging from 200,000 to 2,000,000 in the quantity of at least 0.01 mole per 100 recurring units of isoprene monomer in said synthetic rubber;
reacting the resulting product with an amine of formula (II)

$$H_2N-R^2-A \qquad (II)$$

wherein $R^2$ represents a hydrocarbon residue having not more than 20 carbon atoms, optionally containing an oxygen or sulfur atom in its principal chain, and A represents a dihydrocarbylamino residue having not more than 20 carbon atoms, or a heterocyclic residue having not more than 20 carbon atoms and containing at least one tertiary nitrogen atom alone as a hetero nitrogen atom; and
subjecting the reaction product to dehydration or dealcoholization to form an imide ring.

6. The method of claim 5, wherein said amine is (dialkylamino)alkylamine.

7. A process for manufacturing a modified cis-1,4-polyisoprene rubber, which comprises:
reacting a solid synthetic cis-1,4-polyisoprene rubber with at least 0.01 mole of a maleimide derivative of the formula (I) per 100 recurring units of isoprene monomer in said synthetic rubber:

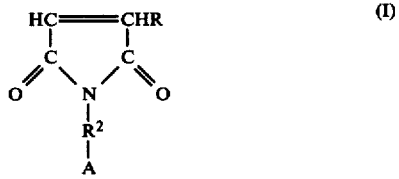

wherein $R^2$ represents a hydrocarbon residue having not more than 20 carbon atoms, and optionally containing an oxygen or sulfur atom in its principal chain, and A represents a dihydrocarbylamino residue having not more than 20 carbon atoms, or a heterocyclic residue having not more than 20 carbon atoms and containing at least one tertiary nitrogen atom alone as a hetero nitrogen atom.

8. The method of claim 7, wherein said maleimide derivative is a compound selected from the group consisting of N-(β-dimethylamino)ethylmaleimide, N-(β-diethylamino)ethylmaleimide, N-(γ-dimethylamino)propylmaleimide, N-(γ-diethylamino)propylmaleimide, N-(δ-dimethylamino)butylmaleimide and N-(δ-diethylamino)butylmaleimide.

9. A vulcanized rubber composition, comprising: as its rubber constituent, modified cis-1,4-polyisoprene rubber comprising solid synthetic cis-1,4-polyisoprene rubber having a side chain functional group of formula (I) incorporated in said synthetic rubber, said modified rubber containing at least 0.01 mole of said functional group per 100 recurring units of isoprene monomer in said synthetic rubber:

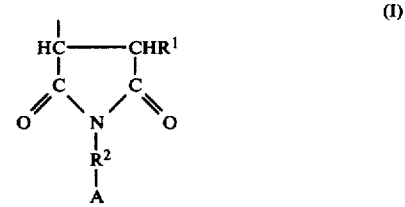

wherein $R^1$ represents hydrogen, or a covalent bond representing bonding of the functional group to the rubber molecule, $R^2$ represents a hydrocarbon residue having not more than 20 carbon atoms, optionally containing an oxygen or sulfur atom in its principal chain, and A represents an N,N-dihydrocarbylamino residue having not more than 20 carbon atoms or a heterocyclic residue having not more than 20 carbon atoms, and containing at least one tertiary nitrogen atom alone as a hetero nitrogen atom.

10. The rubber composition of claim 9, wherein said composition is vulcanized with a vulcanizing agent in the amount of 0.01 to 10 parts per weight per 100 parts per weight of said modified cis-1,4-polyisoprene rubber.

* * * * *